United States Patent [19]

Gotzmann et al.

[11] Patent Number: 5,665,149
[45] Date of Patent: Sep. 9, 1997

[54] ANTI-CORROSION PIGMENT AND USE THEREOF

[75] Inventors: Karl Gotzmann; Karlheinz Dorn, both of Budenheim; Hans-Dieter Nägerl, Dudenhofen; Sieghard Göbelbecker, Bodenheim, all of Germany

[73] Assignee: Chemische Fabrik Budenheim, Budenheim, Germany

[21] Appl. No.: 576,673

[22] Filed: Dec. 21, 1995

[30] Foreign Application Priority Data

Dec. 22, 1994 [DE] Germany ............... 44 45 844.4
Nov. 10, 1995 [DE] Germany ............... 195 41 895.6

[51] Int. Cl.$^6$ ............... C09D 5/08; C09C 1/02
[52] U.S. Cl. ............... 106/14.12; 106/14.05; 106/462; 252/387
[58] Field of Search ............... 106/462, 14.12, 106/14.05; 252/387

[56] References Cited

U.S. PATENT DOCUMENTS 3,960,611  6/1976  Walker et al. ............... 106/462
5,158,610  10/1992  Bittner ............... 106/462

FOREIGN PATENT DOCUMENTS

| 02 59 748 A2 | 3/1988 | European Pat. Off. . |
| 04 59 541 A1 | 12/1991 | European Pat. Off. . |
| 06 03 921 A1 | 6/1994 | European Pat. Off. . |
| 24 58 706 A1 | 6/1975 | Germany . |
| 29 40 695 A1 | 4/1981 | Germany . |
| 37 31 737 C2 | 10/1989 | Germany . |
| 40 14 523 A1 | 11/1991 | Germany . |
| 86 07 371 A1 | 12/1986 | WIPO . |
| 89/02454 | 3/1989 | WIPO ............... 106/462 |

*Primary Examiner*—Anthony Green
*Attorney, Agent, or Firm*—Michael L. Dunn

[57] ABSTRACT

An active heavy metal-free and non-toxic anti-corrosion pigment based on phosphate, which is particularly environmentally friendly, is a mixture of β-tricalcium phosphate and tertiary magnesium phosphate or dicalcium phosphate dihydrate. It has good compatibility with the usual raw materials of paints and additives.

17 Claims, No Drawings

ANTI-CORROSION PIGMENT AND USE THEREOF

The invention describes an active anti-corrosion pigment for the surface protection of metals and metal alloys.

It is known to provide coating materials, used for protecting metals against atmospheric corrosion, with anti-corrosion pigments. Until now mainly toxic pigments based on lead or heavy metal compounds, or chromates, have been used as corrosion inhibiting pigments. However, the use of such toxic pigments is severely limited for reasons of environmental protection. The object was thus to find comparably effective non-toxic pigments which do not affect the environment. The result of this was firstly that there was no lack of endeavours, and in the course of these endeavours it was shown that certain phosphates have perfectly comparable anti-corrosion effects.

In the Journal of Coatings Technology, 58, 1986, 59–65, E. Adrian and A. Bittner stress that the toxic zinc chromate can be replaced with zinc phosphate. According to this report, good results are also obtained with basic zinc-molybdenum-phosphate or zinc-aluminium-phosphate. In DOS 28 49 712 an anti-corrosion pigment composed of a mixture of dicalcium phosphate dihydrate and dimagnesium phosphate trihydrate is described. DOS 29 16 029 claims the manufacture of such a pigment by common precipitation. DOS 29 40 695 in turn claims the use of dicalcium phosphate dihydrate and dimagnesium phosphate trihydrate in combination with zinc oxide. DOS 24 58 706 claims pigments on the basis of magnesium phosphates inter alia also tertiary magnesium phosphate. On the other hand it is known from literature (Journal of the Colour Society, Apr.–Jun. 1969, pages 9–12) that no satisfactory results have been obtained using tertiary magnesium phosphate. Lastly, in DOS 40 14 523, anti-corrosion pigments are described in which β-tricalcium phosphate on its own or in combination with tertiary zinc orthophosphate is used.

Although the anti-corrosion pigments based on phosphate described above have perfectly comparable protective effects in comparison with the toxic pigments used up until now, it was desirable to seek further improved active phosphate pigments, in particular also those which are easily compatible with the usually used resins, binders and other ingredients of anti-corrosion coating materials.

During work, it was discovered in a surprising manner that the very good anti-corrosion effect of β-tricalcium phosphate or of mixtures of β-tricalcium phosphate with tertiary zinc orthophosphate can be further improved when the β-tricalcium phosphate is used in combination with the tertiary magnesium phosphate, which in itself is not particularly effective, or with dicalcium phosphate dihydrate. With this, corrosion inhibiting pigments are obtained which have better anti-corrosion properties than those which contain only , β-tricalcium phosphate, β-tricalcium phosphate and tertiary zinc orthophosphate or magnesium phosphate, or dicalcium phosphate-dihydrate. This unexpected synergistic effect, not predictable by the man skilled in the art, of the described combinations of β-tricalcium phosphate extends over a surprisingly large range of mixtures. The decisive difference in protective behaviour of such mixtures of β-tricalcium phosphate and tertiary magnesium phosphate or dicalcium phosphate dihydrate compared to the individual components and the phosphate pigments described in the state of the art is shown in that the pH values of aqueous slurries of the anti-corrosion pigments according to the invention are in the pH>7 range and thereby in a range in which the atmospheric corrosion by iron ceases as a result of so-called passivation. The anti-corrosion effect of the pigments according to the invention is made stronger in that as a result of hydrolysing and reaction with the atmosphere, $PO_4$ ions and $HPO_4$ ions respectively are released which then immediately react with the unprotected metal surface and form a protective layer of basic iron phosphate. In this reaction mechanism a mutual reaction between the individual components is unmistakeable. This is clearly shown when a comparison is made of the electrical conductivities and pH values of aqueous slurries of the individual components and of the mixtures according to the invention. In 5% aqueous slurries in each case, the following conductivities in $\mu S/cm$ and pH values are measured:

| | | Conductivity | pH Value |
|---|---|---|---|
| tert. $Mg_3(PO_4)_2 \cdot 4H_2O$ | | 149 | 9.63 |
| β-$Ca_3(PO_4)_2$/$Mg_3(PO_4)_2 \cdot 4H_2O$ | 75:25 | 178 | 9.17 |
| β-$Ca_3(PO_4)_2$/$Mg_3(PO_4)_2 \cdot 4H_2O$ | 50:50 | 156 | 9.44 |
| β-$Ca_3(PO_4)_2$/$Mg_3(PO_4)_2 \cdot 4H_2O$ | 25:75 | 134 | 9.48 |
| β-$Ca_3(PO_4)_2$ | | 51 | 8.45 |
| $Ca_2H_2(PO_4)_2 \cdot 2H_2O$ | | 703 | 7.20 |
| β-$Ca_3(PO_4)_2$/$CaH(PO_4) \cdot 2H_2O$ | 1:3 | 594 | 7.25 |
| β-$Ca_3(PO_4)_2$/$CaH(PO_4) \cdot 2H_2O$ | 1:1 | 473 | 7.35 |
| β-$Ca_3(PO_4)_2$/$CaH(PO_4) \cdot 2H_2O$ | 3:1 | 307 | 7.40 |

Moreover, in a coating material which contains such pigments according to the invention chemical reactions occur with the resins and binders which are at least favourable to an additional protective effect. According to J. Ruf "Korrosions Schutz durch Lacke und Pigmente" [Corrosion protection with paints and pigments], page 64, a chemical effect is principally given with basic pigments. The present or forming metal oxides or hydroxides form metal soaps with the fatty acids of the binders. These can improve the physical nature of a paint layer. Furthermore, oxides cause neutralisation of aggressive substances in that they react with the decomposition products of the binder, or convert actively corrosive electrolytes in the medium. In addition chemisorbant, physical and mechanical properties of the anti-corrosion pigments are important, which affect the flexibility, adhesiveness and the abrasion behaviour of a paint layer. The anti-corrosion pigments according to the invention are particularly advantageously used in water-based colour formulations or water-dilutable colours. In such water-containing formulations it is particularly important that the pigments themselves as well as their hydrolysis or decomposition products do not react with other ingredients of the colour. Furthermore, it has been shown that the anti-corrosion effect is not limited to iron or iron alloys, but also aluminium and aluminium alloys are extremely well protected.

The invention consequently preferably relates to an active corrosion inhibiting pigment, which is characterised in that it is composed of a mixture of β-tricalcium phosphate and tertiary magnesium phosphate, wherein the mixture contains 25–75% by weight of β-tricalcium phosphate and 75–25% by weight of tertiary magnesium phosphate. Particularly preferred are mixtures which contain approximately 50% by weight of β-tricalcium phosphate and approximately 50% by weight of tertiary magnesium phosphate or approximately 35% by weight of β-tricalcium phosphate and approximately 65% by weight of dicalcium phosphate dihydrate. The mixtures according to the invention are composed of non-toxic, environmentally non-problematic substances which can be used particularly advantageously in anti-corrosion paint or coating systems. Both individual products can be easily manufactured, they are very compatible with the usual binders and can be worked without difficulty. The anti-corrosion pigment according to the invention advantageously has a particle size of <5 μm. The grain distribution allows optimum packing density in a coating manufactured using this pigment and allows a high pigment volume concentration.

Using example, in order to document the excellent anti-corrosion effect of the anti-corrosion pigment according to the invention compared to other pigments, reference is made to the universally recognised test according to M. F. Clay. In this test bare metal plates are cleaned, de-greased, weighed and placed in aqueous slurries of the respective pigments. Evaluation follows after a reaction time of 30 days of the respective pigment on the sample. At the end of the testing period the sample plates are rinsed, cleaned, dried and the change in weight determined.

The following tables contain the changes in weight of samples exposed to various water/pigment slurries.

Testing of anti-corrosion pigments according to the M. F. Clay method

| | | Loss in mass in % after 30 days |
|---|---|---|
| Talcum | (inert, passive, flaky anti-corrosion pigment) | = 0.36 |
| Comparative example 4 | tertiary zinc phosphate (according to G. Adrian and A. Bittner) | = 0.22 |
| Comparative example 5 | sec. calcium phosphate dihydrate/sec. magnesium phosphate trihydrate 1:1 according to DOS 28 49 712 or DOS 29 16 029 | = 0.324 |
| Comparative example 6 | sec. calcium phosphate dihydrate/sec. magnesium phosphate trihydrate/zinc oxide 1:1:0.1 according to DOS 29 40 695 | = 0.210 |
| Comparative example 7 | tert. magnesium phosphate according to DOS 24 58 706 | = 0.310 |
| Comparative example 8 | β-tricalcium phosphate according to DOS 40 14 523 | = 0.166 |
| Comparative example 9 | β-tricalcium phosphate/tert. zinc phosphate according to DOS 40 12 523 | = 0.205 |
| Pigment according to the invention made from β-tricalcium phosphate/tert. magnesium phosphate | | |
| Example 1 | 75% by weight tricalcium phosphate/25% by weight tert. magnesium phosphate | = 0.105 |
| Example 2 | 50% by weight β-tricalcium phosphate/50% by weight tert. magnesium phosphate | = 0.127 |
| Example 3 | 25% by weight β-tricalcium phosphate/75% by weight tert. magnesium phosphate | = 0.088 |

The present table shows the clearly improved protective effect of the anti-corrosion pigment according to the invention compared to other already known anti-corrosion pigments based on phosphates.

The following examples of applications show the particular protective effect of the anti-corrosion pigment according to the invention compared to the state of the art.

EXAMPLES 1–3

400 ml of distilled water is firstly placed in a laboratory mixer, and while the mixer is operating 600 g of the respective anti-corrosion pigment is worked in gradually. A pigment/water suspension with a solid content of 60% by weight is produced.

Sand blasted plates of 37/2 steel measuring 150×150×1 mm are prepared as follows for the corrosion test: soft rubber rings with an external diameter of 95 mm, internal diameter 50 mm, 2 mm thick are stuck centrally on the surface of the plates. The free surface within the rubber rings is filled with the respective pigment paste, manufactured in the laboratory mixer, and smoothed.

The sample plates prepared in this manner are exposed to a saturated water vapour atmosphere at 35° C. in a Kesternich test apparatus. After a reaction time of 30 days, the plates are removed from the test apparatus, the pigment suspension rinsed off the test surface without any mechanical aid, and the plates then dried at 100° C. Evaluation takes place by photography of the plates with the protected and unprotected surfaces and in addition by visual evaluation.

Example 1

60% by weight suspension of the pigment according to the invention, containing 75% by weight β-tricalcium phosphate and 25% by weight tertiary magnesium phosphate.

Visual Evaluation

Whole surface covered with a homogeneous, fine-grained protective layer, which in places is slightly rust-brown coloured.

Example 2

60% by weight suspension of the pigment according to the invention, containing 50% by weight β-tricalcium phosphate and 50% by weight tertiary magnesium phosphate.

Visual Evaluation

Whole surface covered with homogeneous, fine-grained protective layer, which in places is slightly rust-brown coloured.

Example 3

60% by weight suspension of the pigment according to the invention, containing 25% by weight β-tricalcium phosphate and 75% by weight tertiary magnesium phosphate.

Visual evaluation

Whole surface covered with homogeneous, fine-grained protective layer, which in places is slightly rust-brown coloured.

EXAMPLES 4–9

400 ml of distilled water is firstly placed in a laboratory mixer, and while the mixer is operating 600 g of the respective anti-corrosion pigment is worked in gradually. A pigment/water suspension with a solid content of 60% by weight is produced. In this case also, sand blasted plates of 37/2 steel measuring 150×150×1 mm are prepared as follows for the corrosion test: soft rubber rings with an external diameter of 95 mm, internal diameter 50 mm, 2 mm thick are stuck centrally on the surface of the plates. The surface within the rubber rings (test surface) is filled with the respective pigment paste, manufactured in the laboratory mixer, and smoothed. The sample platens prepared in this manner are exposed to a saturated water vapour atmosphere at 35° C. in a Kesternich test apparatus. After a reaction time of 30 days, the plates are removed from the test apparatus, the pigment suspension rinsed off the test surface without any mechanical aid, and the plates then dried at 100° C. Evaluation takes place by photography of the plates with the protected and unprotected surfaces and in addition by visual evaluation.

Example 4

60% by weight suspension of tertiary zinc phosphate according to G. Adrian and A. Bittner Visual Evaluation The whole test surface is covered with fine-grained rust. At the edge a thin layer interspersed with rust can be recognised.

Example 5

60% by weight suspension containing 50% by weight of secondary calcium phosphate dihydrate and 50% by weight of secondary magnesium phosphate trihydrate according to DOS 28 49 712 or 29 16 029.

Visual Evaluation

Approximately half of the test surface is highly corroded, the remaining surface is covered with a protective layer which is, however, interspersed with rust.

Example 6

60% by weight suspension of secondary calcium phosphate dihydrate, secondary magnesium phosphate trihydrate and zinc oxide in the mixture ratio of 1:1:0.1 according to DOS 29 40 695

Visual Evaluation

Surface corrosion with rust crust in places on a part of the test surface. On one part of the surface a protective layer interspersed with rust is recognisable. Some small areas are without rust and without protective layer.

Example 7

60% by weight suspension of tertiary magnesium phosphate according to DOS 24 58 706.

Visual Evaluation

The whole test surface is covered with a protective layer which is partly (approximately 50% of the surface) interspersed with light rust.

Example 8

60% by weight suspension of/tricalcium phosphate according to DOS 40 14 523.

Visual Evaluation

The test surface is covered with rust over almost the whole surface. In parts thick rust crusts with included pigment can be recognised.

Example 9

60% by weight suspension of β-tricalcium phosphate and tertiary zinc phosphate in a mixture ratio of 3:1 according to DOS 40 14 523.

Visual Evaluation

The whole test surface is covered with a protective layer interspersed with fine rust.

What is claimed is:

1. Anti-corrosion pigment for surface protection of metals or metal alloys, with phosphate, wherein the anti-corrosion pigment comprises a mixture of β-tricalcium phosphate with a second phosphate selected from the group consisting of tertiary magnesium phosphate and dicalcium phosphate dihydrate, said pigment having better anti-corrosion properties than pigments which contain only β-tricalcium phosphate tertiary magnesium phosphate or dicalcium phosphate dihydrate.

2. Anti-corrosion pigment according to claim 1, wherein it is composed of 25–75% by weight β-tricalcium phosphate and 75–25% by weight of said second phosphate.

3. Anti-corrosion pigment according to claim 2, wherein the second phosphate is tertiary magnesium phosphate.

4. Anti-corrosion pigment according to claim 2, wherein it is composed of approximately 35% by weight β-tricalcium phosphate and approximately 65% by weight dicalcium phosphate dihydrate.

5. Anti-corrosion pigment according to claim 1, wherein it has a grain size of <5 μm.

6. Anti-corrosion pigment according to claim 2, wherein it has a grain size of <5 μm.

7. An anti-corrosion pigment according to claim 1 in admixture with other paint ingredients.

8. An anti-corrosion pigment according to claim 2 in admixture with other paint ingredients.

9. An anti-corrosion pigment according to claim 3 in admixture with other paint ingredients.

10. An anti-corrosion pigment/according to claim 5 in admixture with other paint ingredients.

11. An anti-corrosion pigment according to claim 6 in admixture with other paint ingredients.

12. An aqueous paint formulation comprising the pigment of claim 1.

13. An aqueous paint formulation comprising the pigment of claim 2.

14. An aqueous paint formulation comprising the pigment of claim 3.

15. Anti-corrosion pigment for surface protection of metals or metal alloys, with phosphate wherein the anti-corrosion pigment comprises a mixture of from 25 to 75 weight percent β-tricalcium phosphate with from 75 to 25 weight percent of a second phosphate selected from the group consisting of tertiary magnesium phosphate and dicalcium phosphate dihydrate, said pigment having better anti-corrosion properties than pigments which contain only β-tricalcium phosphate, tertiary magnesium phosphate or dicalcium phosphate dihydrate alone.

16. The anti-corrosion pigment of claim 15 wherein the second phosphate is tertiary magnesium phosphate.

17. Anti-corrosion pigment for surface protection of metals or metal alloys, with phosphate, wherein the anti-corrosion pigment is a synergistic mixture of from 25 to 75 weight percent β-tricalcium phosphate with from 75 to 25 weight percent of a second phosphate selected from the group consisting of tertiary magnesium phosphate and dicalcium phosphate dihydrate.

* * * * *